(12) United States Patent
Gremillion

(10) Patent No.: US 11,000,019 B1
(45) Date of Patent: May 11, 2021

(54) BEEHIVE PEST TRAP

(71) Applicant: Bryan Francis Gremillion, Orange, TX (US)

(72) Inventor: Bryan Francis Gremillion, Orange, TX (US)

(*) Notice: Subject to any disclaimer, the term of this patent is extended or adjusted under 35 U.S.C. 154(b) by 0 days.

(21) Appl. No.: 17/083,031

(22) Filed: Oct. 28, 2020

Related U.S. Application Data

(60) Provisional application No. 62/927,256, filed on Oct. 29, 2019.

(51) Int. Cl.
  *A01K 47/06* (2006.01)
  *A01K 51/00* (2006.01)
  *A01M 1/10* (2006.01)
  *A01M 1/04* (2006.01)

(52) U.S. Cl.
  CPC .............. *A01K 51/00* (2013.01); *A01K 47/06* (2013.01); *A01M 1/04* (2013.01); *A01M 1/103* (2013.01); *A01M 1/106* (2013.01)

(58) Field of Classification Search
  CPC ........ A01K 47/00; A01K 47/02; A01K 47/04; A01K 47/06; A01K 51/00; A01M 1/04; A01M 1/08; A01M 1/103; A01M 1/106; A01M 1/145
  USPC .......................... 449/3–46; 43/113, 119–121
  See application file for complete search history.

(56) References Cited

U.S. PATENT DOCUMENTS

| | | | | |
|---|---|---|---|---|
| 3,343,186 A * | 9/1967 | Dunand | ................ | A01K 47/00 449/9 |
| 4,007,504 A * | 2/1977 | West | ..................... | A01K 47/06 449/13 |
| 4,599,757 A * | 7/1986 | Shaparew | ............. | A01K 47/06 449/19 |
| 6,468,129 B1 * | 10/2002 | Griffith | ................. | A01K 51/00 449/20 |
| 10,729,109 B1 * | 8/2020 | Wolfe, II | ............... | A01K 47/06 |
| 2007/0224913 A1 * | 9/2007 | Brisson | .................. | A01K 51/00 449/3 |
| 2016/0330938 A1 * | 11/2016 | Jones | ..................... | A01K 55/00 |
| 2019/0313609 A1 * | 10/2019 | Wallace | ................. | A01K 47/06 |

* cited by examiner

*Primary Examiner* — Peter M Poon
*Assistant Examiner* — Danielle A Clerkley

(57) ABSTRACT

A beehive pest trap includes a first surface, second surface, and side beams. The side beams are coupled to and support the second surface. The side beams are coupled to and positioned on the first surface. The second surface is coupled to and positioned on the side beams. The first surface, second surface, and side beams form a gate entrance. The second surface is positioned parallel to the first surface. The second surface is wider than the first surface. The gate entrance is positioned proximate to an insect trap. The second surface is L-shaped. The trap also includes a screen and a trap drawer. The first surface comprises a lateral side. The lateral side and the side beam form a cavity. The trap door is slidably positioned in the cavity. The insect trap includes the trap drawer. The second surface includes a pest door slidably coupled thereto.

7 Claims, 7 Drawing Sheets

BEEHIVE PEST TRAP

CROSS-REFERENCE TO RELATED APPLICATIONS

This application claims priority to U.S. Provisional Application No. 62/927,256 filed Oct. 29, 2019, which is hereby incorporated herein by reference.

FIELD OF THE INVENTION

The present invention generally relates to a pest trap. More specifically, the present invention relates to a pest trap to prevent pests from entering a beehive.

BACKGROUND OF THE INVENTION

Unprotected beehives may often be laden with pests that bring great damage to the hives the bees and beekeepers have worked so hard to build. The pests that can bring such damage include wax moths, small hive beetles, and *Varroa* mites which may feed in the honey, wax, pollen, or the bees themselves. As the pests carve out destruction, the wastes left behind can prevent the bees from using the damaged comb and rebuilding. Weak colonies of bees are especially susceptible to pest invasions as they do not have the resources to quickly remove them. There is a need in the art to provide a device that is easily attached to existing beehives that allows beekeepers to stop invading pests.

BRIEF DESCRIPTION OF THE DRAWINGS

Some of the embodiments will be described in detail, with reference to the following figures, wherein like designations denote like members, wherein.

Figure 1:
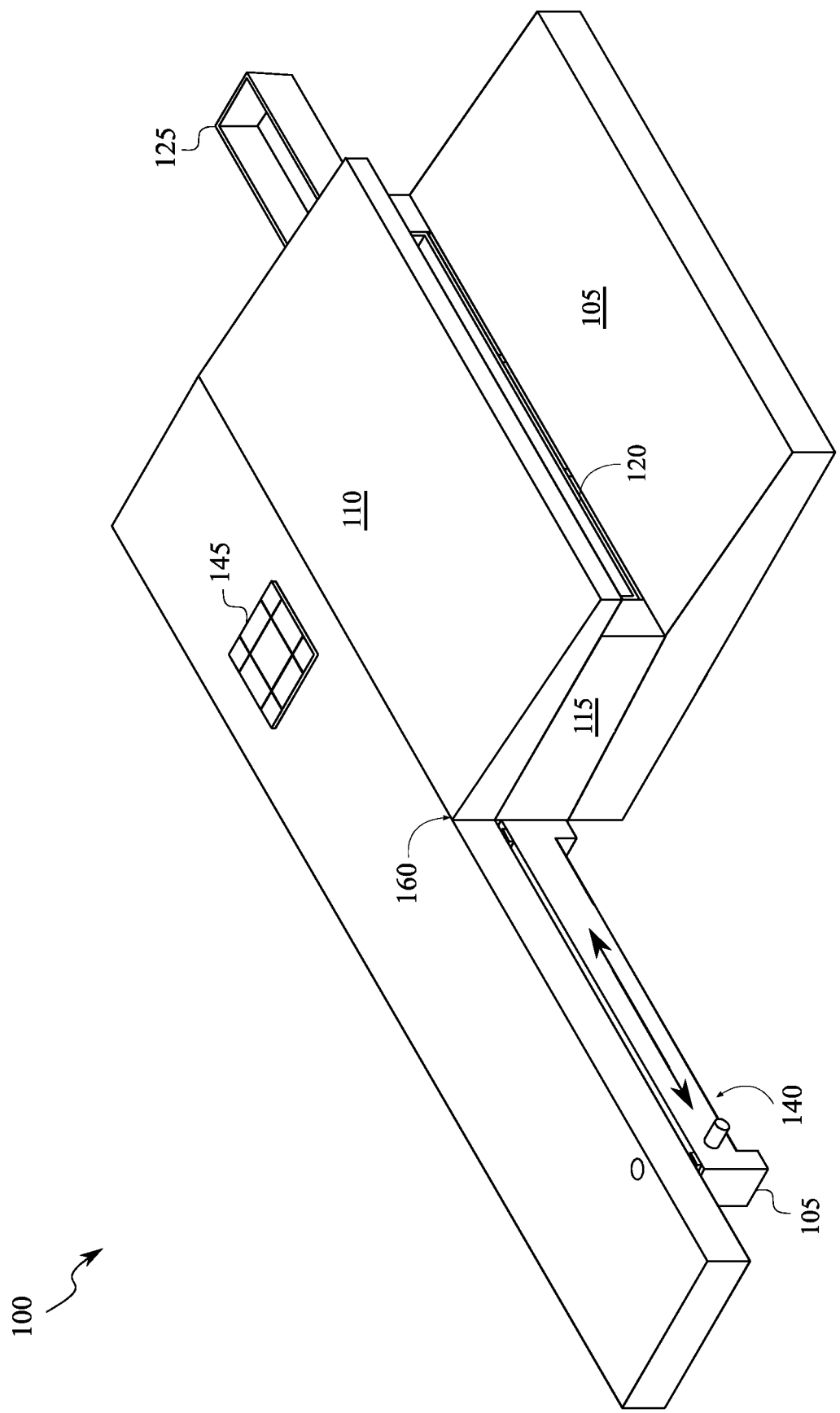
FIG. 1 depicts a top left perspective view of a beehive pest trap, according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

Unprotected beehives may often be laden with pests that bring great damage to the hives the bees and beekeepers have worked so hard to build. The pests that can bring such damage include wax moths, small hive beetles, and *Varroa* mites which may feed in the honey, wax, pollen, or the bees themselves. As the pests carve out destruction, the wastes left behind can prevent the bees from using the damaged comb and rebuilding. Weak colonies of bees are especially susceptible to pest invasions as they do not have the resources to quickly remove them.

The instant disclosure seeks to provide a beehive pest trap device that is easily attached to existing beehives that allows beekeepers to stop invading pests. The disclosed beehive trap device may be attached to the bottom board of a standard Langstroth hive using fasteners or clamps and provides bees with an entrance while also keeping invaders from entering using multiple traps and lights. Traps are positioned at various locations along the beehive pest trap device that allow pests to enter but also keep bees out. Red lights at the hive entrance discourage pests from entering the hive and simultaneously lead them to a false entrance in which lies poisoned traps. Traps are easily removed to remove pest carcasses and reload the trap with poison.

Figure 2:
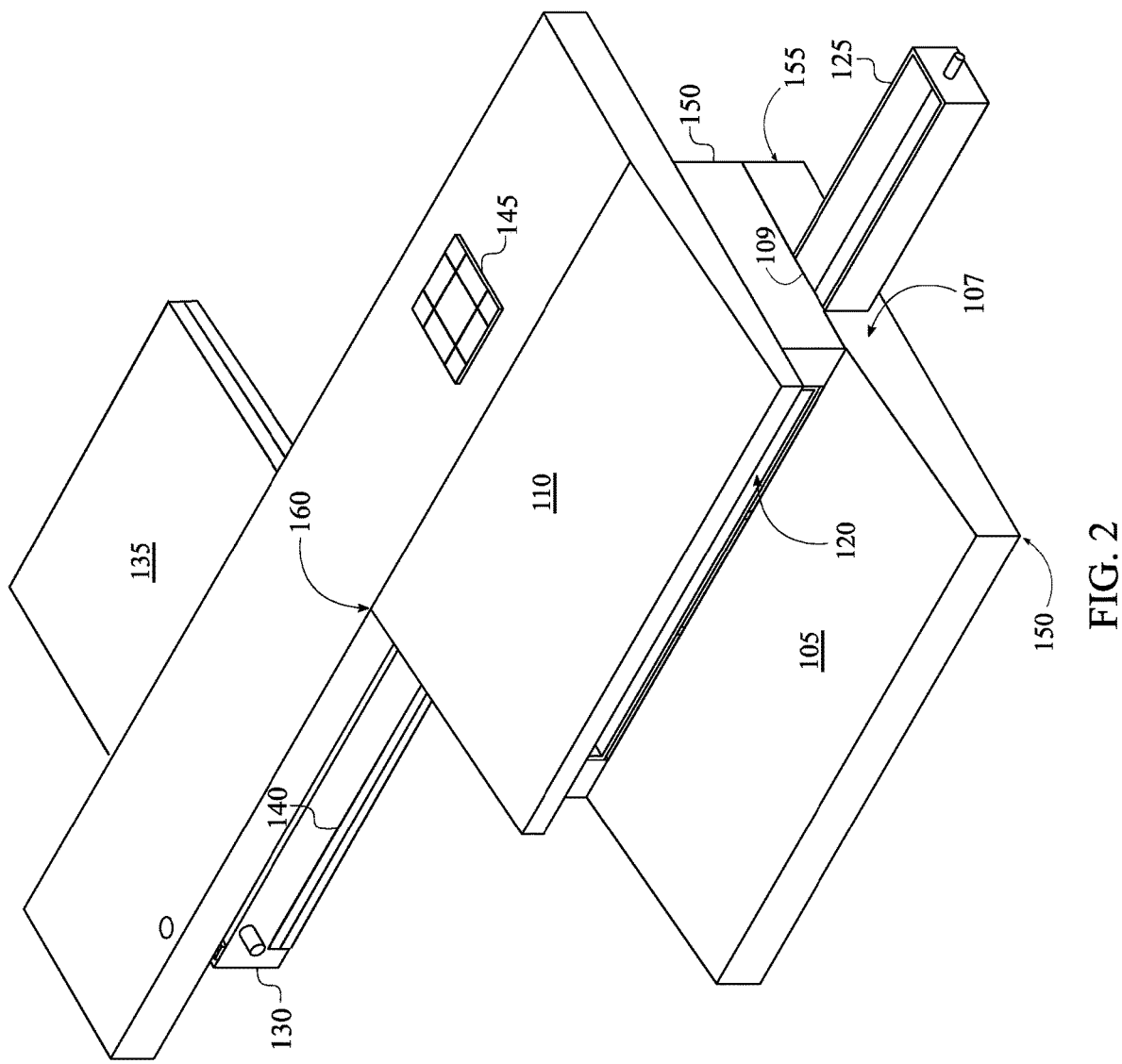
FIG. 2 depicts a top right perspective view of the beehive pest trap, according to other embodiments.

FIGS. 1-2 depict a top left and top right perspective views of a beehive pest trap device, generally 100, according to some embodiments. The beehive pest trap device 100 includes a first surface 105, a second surface 110, and a side beams 115. The first surface 105, the second surface 110, and the side beams 115 are preferably made of wood, but may also be made of polymers, composite materials, metallic materials, or a combination of two or more thereof. The side beams 115 are coupled to and support the second surface 110. The side beams 115 has planar sides. In other words, the second surface 110 is positioned on the side beams 115. The side beams 115 are coupled to and positioned on the first surface 105. The second surface 110 is coupled to and positioned on the side beams 115. The second surface 110 is oriented parallel to the first surface 105. The first surface 105, the second surface 110, and the side beams 115 form a gate entrance 120. The second surface 110 is wider than the first surface 105. The side beams 115 are oriented perpendicular to the first surface 105 and the second surface 110. The gate entrance 120 is positioned proximate to an insect trap 510. The second surface 110 is L-shaped and has an inflection point 160. The inflection point 160 is positioned atop of one of the side beams 115.

Figure 3:
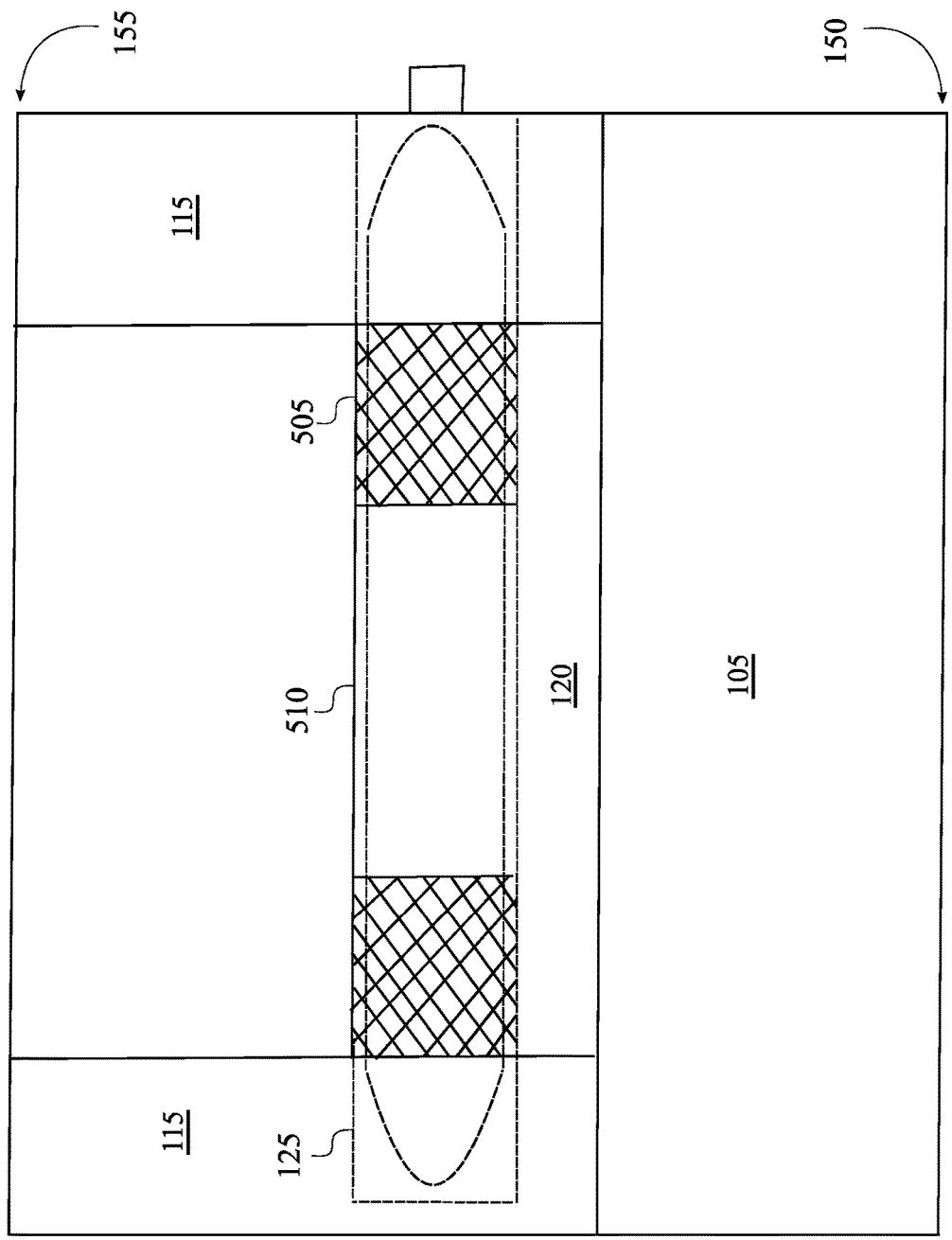
FIG. 3 depicts a top view of the first surface and side beams of the beehive pest trap, according to certain embodiments.

FIG. 3 is a top view of the first surface and side beams of the beehive pest trap 100, according to certain embodiments. At least one screen 305 is positioned proximate to the gate entrance 120. A platform 310 is positioned proximate to the gate entrance 120. A screen 305 is positioned adjacent to the platform 305. The platform 305 provides an area for bees to enter the beehive. The screen 305 preferably includes wire mesh. The screen 305 and the platform 310 are each oriented perpendicular to the gate entrance 120. The screen 305 preferably includes holes that are smaller than a bee but allow pests that are smaller than bees to pass through. The gate entrance 120 is preferably positioned on a portion of the screen 305 and the platform 515. The first surface 105 includes a lateral side 107. The lateral side 107 and side beam 115 form a cavity 109. A trap drawer 125 is slidably positioned in the cavity 109.

The trap drawer 125 is a hollow component that is introduced a void (e.g., a cavity 109) formed by the first surface 105 and the side beams 115. The insect trap 300 include the screen 305 and the trap drawer 125 when the trap drawer is inserted in the cavity 109. The trap drawer 125 is positioned below the screen 305 and proximate to the gate entrance 120 when positioned in the side beam 115. When pest pass through the screen 305 they fall in to the trap drawer 125, which can include poisonous materials (i.e. material that is poisonous to bee pests). The screen 305 is positioned on the first surface 105. The screen 305 is positioned proximate to the gate entrance 120. The trap drawer 125 is positioned below the screen 305 and proximate to the gate entrance 120 when positioned in the cavity 109.

Figure 4:
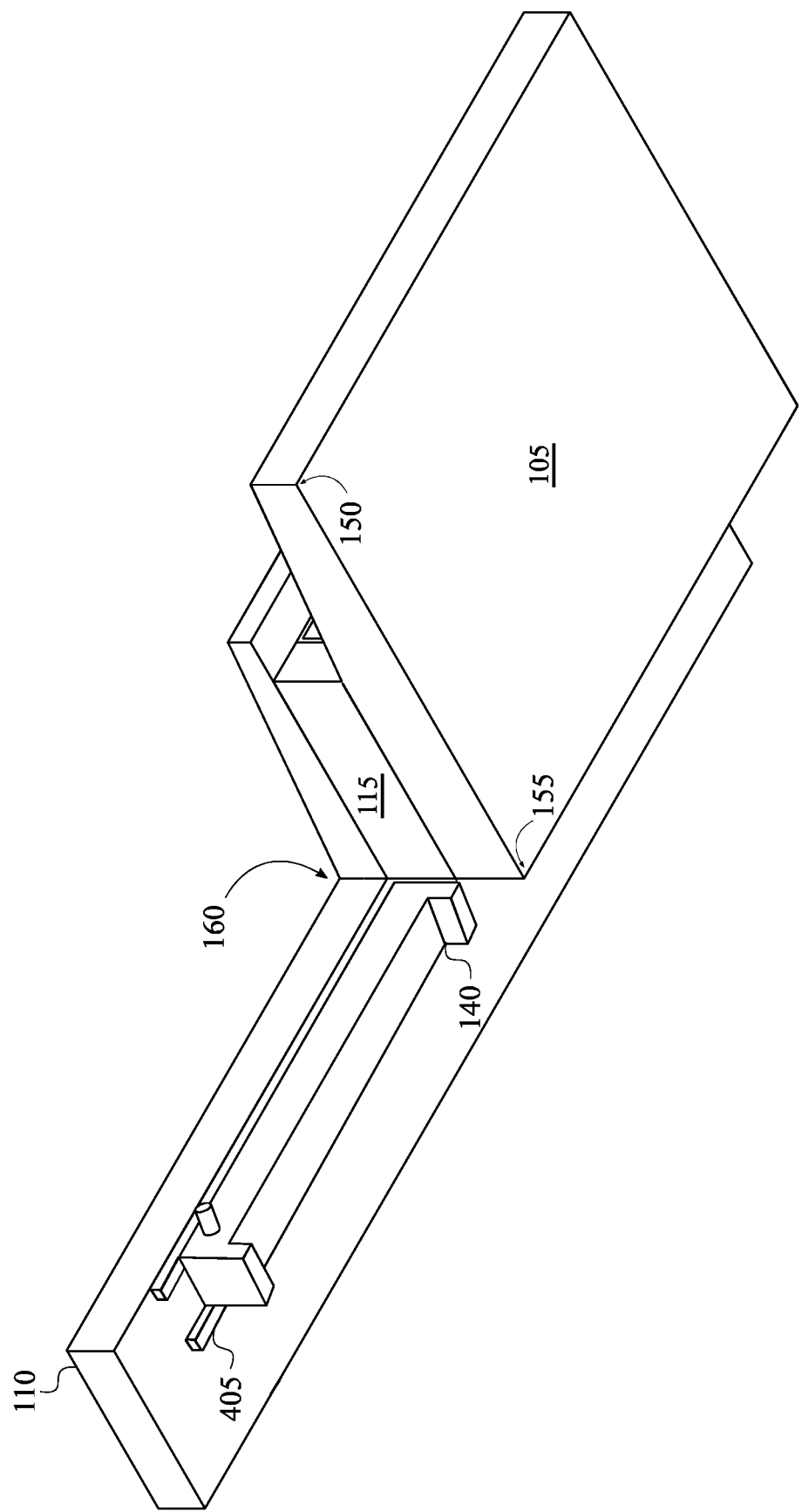
FIG. 4 depicts a bottom left perspective view of the beehive pest trap, according to yet still other embodiments.
Figure 5:
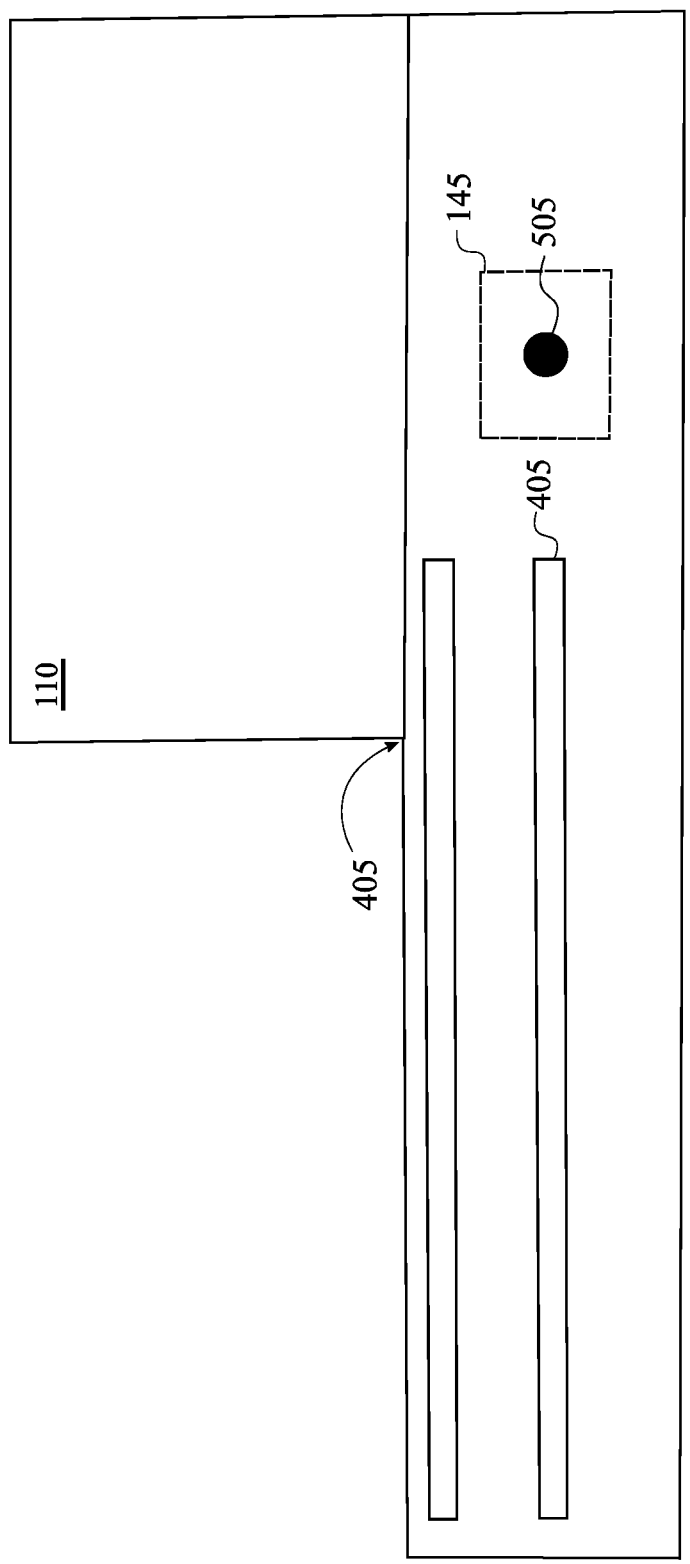
FIG. 5 depicts a bottom view of a second surface of the beehive pest trap, according to some embodiments.

The screen 305 is positioned above the trap drawer 125 when the trap drawer 125 is positioned within the side beam 115. FIG. 4 is a bottom left perspective view of the beehive pest trap 100, according to yet still other embodiments. The second surface 110 includes a pest door 130. The pest door 130 extends from under the second surface 110. The pest door 130 is slidably coupled to the second surface 110 (e.g., via rails 405). The pest door 130 preferably has a substantially rectangular shape. The pest door 130 preferably includes a notch 140 that receives a clamshell shell trap 135 (as depicted in FIG. 2). The notch 140 is longitudinally positioned on the pest door 130. The second surface 110 is tapered shaped. The second surface 110 tapers towards the gate entrance 120. Specifically, the second surface 110 tapers from the inflection point 160 towards the gate entrance 120. The second surface 110 includes a solar panel 145 communicatively coupled to a light source 505. The light source 505 preferably includes one or more light emitting diodes (LEDs). The light source 505 is preferably coupled to the second surface 110 opposite the solar panel 145. The light source 505 can be permanently or dynamically affixed to the second surface 110. The light source 505 preferably projects red light to deter pests from entering the beehive.

The light source 505 can include a housing (e.g., for protection from the elements and/or pests). The first surface 105 includes a first end 150 and a second end 155. The second end 155 is positioned proximate to the side beam 115. The first surface 105 tapers towards the first end 150.

Figure 6:
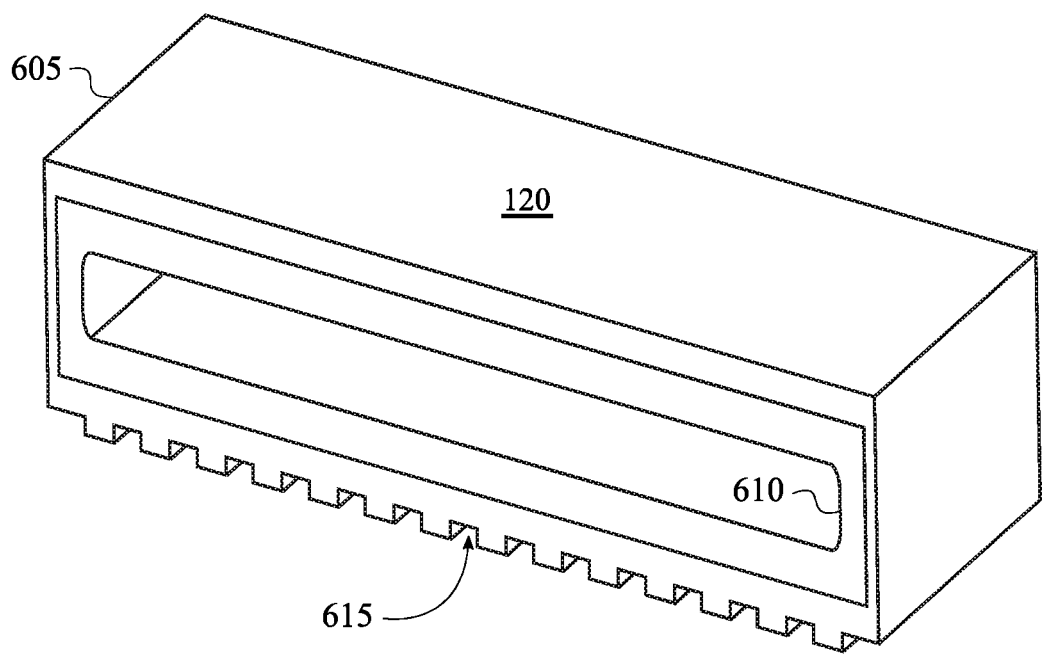
FIG. 6 depicts a top right perspective view of a gate entrance of the beehive pest trap, according to other embodiments.
Figure 7:
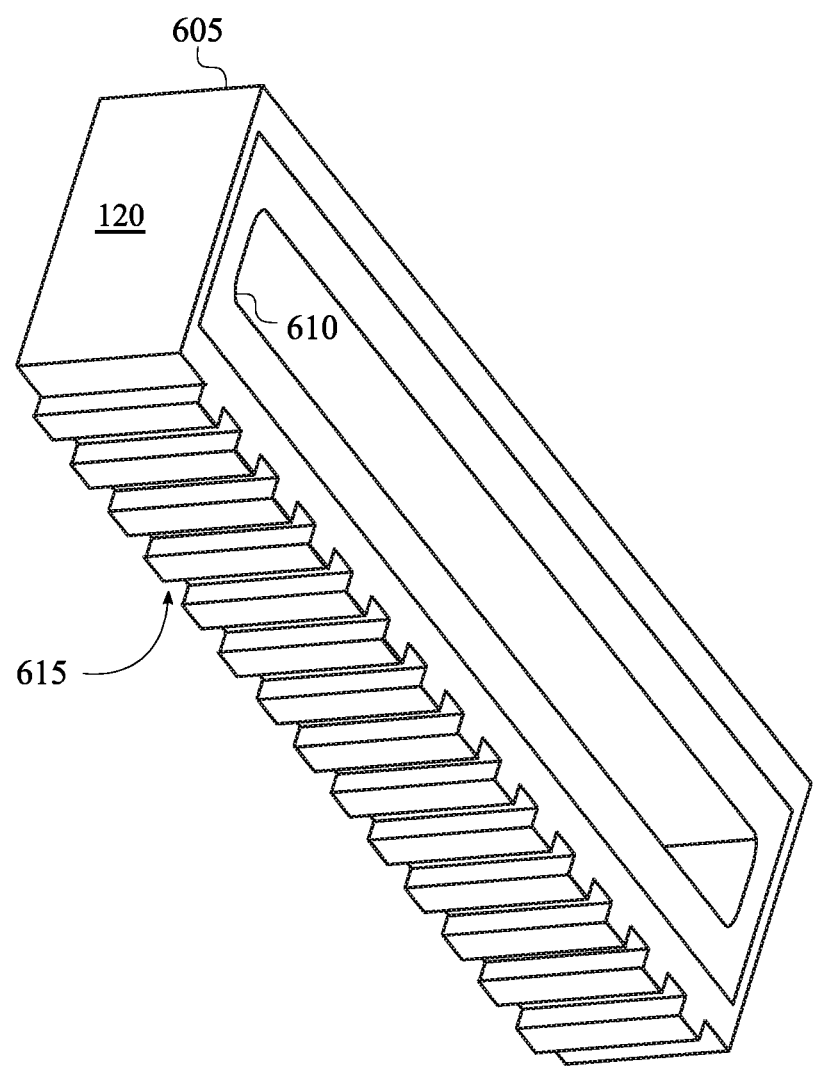
FIG. 7 depicts a bottom left perspective view of the gate entrance, according to yet certain embodiments.

FIGS. 6-7 depict a top right and a bottom left perspective views, respectively, of the gate entrance 120, according to other embodiments. The gate entrance 120 includes a body 605, an orifice 610 that extends through the body 605, and a plurality of spaces 615 positioned along the bottom surface of the body 605. The plurality of spaces 615 provide support between the gate entrance 120 and the first surface 105. The orifice 610 is oblong shaped, rectangular shaped, or a combination of the two. The orifice 610 has a shape that does not restrict the movement of bees into and out of the beehive. The orifice 610 is preferably centrally positioned on the gate entrance 120. In certain embodiments, the orifice 610 is offset to a particular side of the gate entrance 120. The orifice 610 longitudinally extends along the gate entrance 120. In an alternate configuration, the present invention may comprise an entry cover which may partially or entirely cover the opening of the gate entrance 120.

Although the invention has been explained in relation to its preferred embodiment, it is to be understood that many other possible modifications and variations can be made without departing from the spirit and scope of the invention.

The invention claimed is:

1. A beehive pest trap, comprising:
a first surface;
a second surface;
a plurality of side beams;
wherein
the side beams are coupled to and support the second surface;
the side beams are coupled to and positioned on the first surface;
the second surface is coupled to and positioned on the side beams;
the first surface, the second surface, and the side beams form a gate entrance;
the second surface is positioned parallel to the first surface;
the second surface is wider than the first surface;
the gate entrance is positioned proximate to an insect trap;
the second surface is L-shaped;
a screen;
a trap drawer;
wherein the first surface comprises a lateral side;
wherein the lateral side and the side beam form a cavity;
wherein the trap drawer is slidably positioned in the cavity; and
wherein the insect trap comprises the trap drawer,
the second surface comprises a pest door;
the pest door extends from under the second surface; and
the pest door is slidably coupled to the second surface,
the pest door comprises a notch that receives a clamshell shell trap; and
the notch is longitudinally positioned on the pest door.

2. The beehive pest trap of claim 1, wherein
the second surface is tapered shaped; and
the second surface tapers towards the gate entrance.

3. The beehive pest trap of claim 2, wherein
the second surface comprises a solar panel communicatively coupled to a light source; and
the light source is coupled to the second surface opposite the solar panel.

4. The beehive pest trap of claim 3, wherein
the first surface comprises a first end and a second end;
the second end is positioned proximate to the side beam; and
the first surface tapers towards the first end.

5. The beehive pest trap of claim 4, wherein
the gate entrance comprises an orifice; and
the orifice longitudinally extends along the gate entrance.

6. The beehive pest trap of claim 5, wherein
the screen is positioned on the first surface; and
the screen is positioned above the trap drawer when the trap drawer is positioned within the side beam.

7. The beehive pest trap device of claim 6, wherein
the screen is positioned proximate to the gate entrance;
the trap drawer is positioned below the screen and proximate to the gate entrance when positioned in the cavity; and
the insect trap comprises the screen and the trap drawer.

* * * * *